(12) United States Patent
Been (10) Patent No.: US 9,994,335 B1
(45) Date of Patent: Jun. 12, 2018

(54) RAPID UNMANNED AERIAL VEHICLE LAUNCHER (UAV) SYSTEM

(71) Applicant: The United States of America, as represented by the Secretary of the Navy, Washington, DC (US)

(72) Inventor: Robert Joseph Been, Sacramento, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 261 days.

(21) Appl. No.: 15/131,733

(22) Filed: Apr. 18, 2016

Related U.S. Application Data

(60) Provisional application No. 62/170,879, filed on Jun. 4, 2015, provisional application No. 62/275,864, filed on Jan. 7, 2016.

(51) Int. Cl.
*B64F 1/04* (2006.01)
*B64C 39/02* (2006.01)

(52) U.S. Cl.
CPC .............. *B64F 1/04* (2013.01); *B64C 39/024* (2013.01); *B64C 2201/084* (2013.01)

(58) Field of Classification Search
CPC ... B64C 39/024; B64C 2201/084; B64F 1/04; B64F 1/06
USPC .......................................................... 244/63
See application file for complete search history.

(56) References Cited

U.S. PATENT DOCUMENTS

| 1,846,157 | A | * | 2/1932 | Stevens | ..................... B64F 1/06 124/25 |
| 2,696,957 | A | * | 12/1954 | Brown | ...................... B64F 1/02 244/110 A |
| 3,905,350 | A | * | 9/1975 | Becker | .................. A63H 27/14 124/17 |
| 3,968,947 | A | * | 7/1976 | Schlegel | .................. B64F 1/06 244/63 |

(Continued)

OTHER PUBLICATIONS

Novakovic et al., "Increasing Launch Capability of a UAV Bungee Catapult," Scientific Technical Review 64(4) (2014).

(Continued)

*Primary Examiner* — Richard R Green
*Assistant Examiner* — Brady W Frazier
(74) *Attorney, Agent, or Firm* — Naval Postgraduate School; James B. Potts; Lisa A. Norris (57) ABSTRACT

The disclosure provides a rapid UAV launcher comprising an upper shuttle assembly and typically a plurality of rail systems. Each rail system comprises a lower shuttle assembly extending into a rail channel and translating over a rail surface. The rail channels of each rail system e generally parallel. The lower shuttle assembly of each rail system is coupled to a winch strap at a first end and an intermediary rope toward the intended direction of launch. The intermediary rope extends through the rail channel, through a brake disposed in the rail channel, around a pulley, and couples to a forward bungee connector coupled to an elastic unit. During a launch sequence, a rear mounted winch reels the winch strap to pull the lower shuttle assembly toward the winch, elongating the elastic unit, and providing individual tension forces to the lower shuttle assembly of each rail system.

16 Claims, 5 Drawing Sheets

(56) References Cited

U.S. PATENT DOCUMENTS

| | | | | |
|---|---|---|---|---|
| 4,060,930 | A | * 12/1977 | Hirtle | A63H 27/14 446/65 |
| 4,238,093 | A | * 12/1980 | Siegel | B64F 1/06 244/63 |
| 4,678,143 | A | * 7/1987 | Griffin | B64F 1/06 244/63 |
| 4,909,458 | A | * 3/1990 | Martin | B64F 1/06 244/63 |
| 5,671,722 | A | * 9/1997 | Moody | F41B 7/00 124/17 |
| 5,695,153 | A | 12/1997 | Britton et al. | |
| 6,457,673 | B1 | * 10/2002 | Miller | B64F 1/06 244/63 |
| 6,851,647 | B1 | * 2/2005 | Rosenbaum | B64F 1/06 244/63 |
| 8,584,985 | B2 | 11/2013 | Wooley et al. | |
| 2003/0116677 | A1 | * 6/2003 | Young | A63H 27/14 244/63 |
| 2006/0186266 | A1 | * 8/2006 | Kennedy | A63H 27/14 244/63 |
| 2007/0252034 | A1 | * 11/2007 | McGeer | B64C 39/024 244/63 |
| 2013/0277497 | A1 | * 10/2013 | Jones | B64F 1/06 244/63 |
| 2015/0060600 | A1 | * 3/2015 | Tully | B64F 1/08 244/63 |

OTHER PUBLICATIONS

Novakovic et al.,"Analysis of a UAV Bungee Cord Launching Device," Scientific Technical Review 63(3) (2013).

* cited by examiner

RAPID UNMANNED AERIAL VEHICLE LAUNCHER (UAV) SYSTEM

RELATION TO OTHER APPLICATIONS

This patent application claims priority from provisional patent application 62/170,879 filed Jun. 4, 2015 and provisional patent application 62/275,864 filed Jan. 7, 2016, both of which are hereby incorporated by reference.

FIELD OF THE INVENTION

One or more embodiments relates to an apparatus and method of use for a catapult UAV launcher comprising typically a plurality of rail systems and utilizing a plurality of elastic units such as bungees for motive force. The catapult system partitions an overall force generated by elongation of the elastic units using a winch into substantially equivalent forces applied within each rail system to provide alignment and uniform acceleration during launch.

BACKGROUND

Utilization of unmanned aerial vehicles (UAVs) is rapidly increasing in private, commercial, and military applications. These aircraft are powered aerial vehicles capable of flight either under human control or autonomously, and may be designed to function as traditional rotary wing, multi-rotor, or fixed-wing platforms. UAVs are frequently deployed in efforts related to search and rescue, meteorological assessments, traffic surveillance, agricultural crop monitoring, and others, and are capable of performing highly diverse and increasingly complicated missions. Mechanisms for safe and effective launching is a significant area of current interest and a variety of means have been employed, including horizontal take-off and landing (HTOL) when a prepared surface is available, catapulted or zero-length rocket-powered launches when runways are precluded, and vertical take-off and landing (VTOL). In generally limited cases hand-launching may be employed if the UAV is sufficiently light and has a sufficiently low stall speed.

A developing mission area that is of particular interest to many entities in the defense and commercial sectors is that of UAV swarming, which requires multiple UAVs to be launched in a relatively short period of time. Under these scenarios, the launcher must provide sufficient force for launch in a relatively fast cycle in order to maximize the usability of the entire swarm once airborne. Further, if such a launch is intended from relatively remote areas, the launcher needs to provide this with relatively compact, transportable design and with a relative minimum of force-bearing components to enhance reliability. Additionally and ideally, the launcher should additionally require a minimum of consumables such as compressed air canisters or other motive means, in order to enhance its overall portability and operational independence.

Provided here is a UAV launcher operating a catapulted shuttle where one or more rail systems, typically at least two, provide motive force to the shuttle assembly through the use of tensioned elastic members. When a plurality of rail systems is present, the elastic members are independently tensioned within each rail system in order to equally partition the overall resulting force acting on the shuttle assembly during launch, in order to maximize possible cycling of the system manner which avoids excessive hysteresis and inefficiency introduced through use of larger components typically found in single rail launching systems. Additionally, equal partitioning of the resultant force across all rail systems in a direction generally parallel to the axes of the rail channels mitigates any misalignment tendencies during launch which might otherwise occur in a multiple rail launch system where the overall resultant force is applied at a single location on the shuttle assembly. The UAV launcher disclosed herein provides for the rapid launch of multiple UAVs safely, effectively, and in quick succession, and provides a compact design enhancing portability and allowing for relatively independent operation.

These and other objects, aspects, and advantages of the present disclosure will become better understood with reference to the accompanying description and claims.

SUMMARY

The UAV launcher disclosed comprises an upper shuttle assembly and one or more rail systems. Each rail system comprises a lower shuttle assembly coupled to the upper shuttle assembly. In an individual rail system, the lower shuttle assembly extends into a rail channel and may translate through the rail channel over a rail surface. The lower shuttle assembly is coupled to a winch strap at one end and coupled to an intermediary rope at an end toward the intended. direction of launch. The intermediary rope extends through the rail channel and around a pulley at the launching end of the UAV launcher, and subsequently couples to a forward bungee connector. An elastic unit is coupled to the forward bungee connector and additionally coupled to an aft bungee connector. During a launch sequence, a rear mounted winch reels the winch strap to pull the lower shuttle assembly (and upper shuttle assembly) toward the winch, resulting in the intermediary rope displacing the forward bungee connector and elongating the elastic unit. This occurs simultaneously in all the rail systems comprising the UAV launcher, so that the total energy stored within the elongating elastic units is portioned evenly for distribution to each respective rail system. At a particular point, the winch is released and the retracting bungees act to pull equally on each lower shuttle assembly, rapidly translating the shuttle assembly toward the pulley. This translation continues until the lower shuttle assembly in each rail system encounters a rubber pad brake disposed within the rail channel of each rail system. Generally simultaneously, the winch strap is at the bitter end of travel and acts to stop the lower shuttle assembly as the lower shuttle assembly encounters the brake. The brake arrests shuttle assembly motion and a loaded UAV ejects. In certain embodiments, the brake is positioned such that when contact with the lower shuttle assembly occurs, the elastic unit of each rail systems arrests in a partially elongated state, so that the elastic unit provides generally linear characteristics and acceleration over the launch cycle.

When the UAV launcher comprises a plurality of rails systems, the rail channels of each rail system are generally parallel, and the elastic units within each rail systems provide substantially equivalent force on the lower shuttle assembly of the rail system, in order to mitigate any misalignment which might occur as the upper shuttle assembly translates during a launch cycle. Generally, the winch strap of each rail systems is coupled to and reeled by a single, common winch shaft to assist in establishing essentially equivalent elongation of each of the elastic units. Similarly, each elastic unit possesses a substantially equivalent spring constant, so that forces generated as a result of the generally equivalent elongation are similarly equivalent. This generation of largely equal forces within each rail system provides for equal forces and acceleration of the lower shuttle assembly within the rail system during launch. Additionally, the use of the intermediary rope over a pulley within each rail system to transmit the tension force of the relaxing elastic members to the lower shuttle assembly allows use of a redirecting pulley having minimum mass, friction, and inertia, and avoids reversing the direction of the elastic members to mitigate losses which might otherwise occur if the elastic member extended over the pulley. The disclosure further provides a method for launching a UAV using the disclosed UAV launcher.

The novel apparatus and principles of operation are further discussed in the following description.

Embodiments in accordance with the invention are further described herein with reference to the drawings.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a UAV launcher and method of use for a catapult UAV launcher employing motive force generated through the elongation of elastic members. Embodiments in accordance with the invention rapidly launch multiple small Unmanned Aerial Vehicles (UAVs). Embodiments in accordance with the invention have application in areas utilizing multiple UAVs, such as in research, development, and utilization of swarm UAV technology in military and Human Assistance and Disaster Relief (HADR) projects. The disclosed launcher is generally designed for performance, reliability, operator safety, robustness, speed of launch repetition, constructability, and maintainability, and with minimal setup time.

Figure 1:
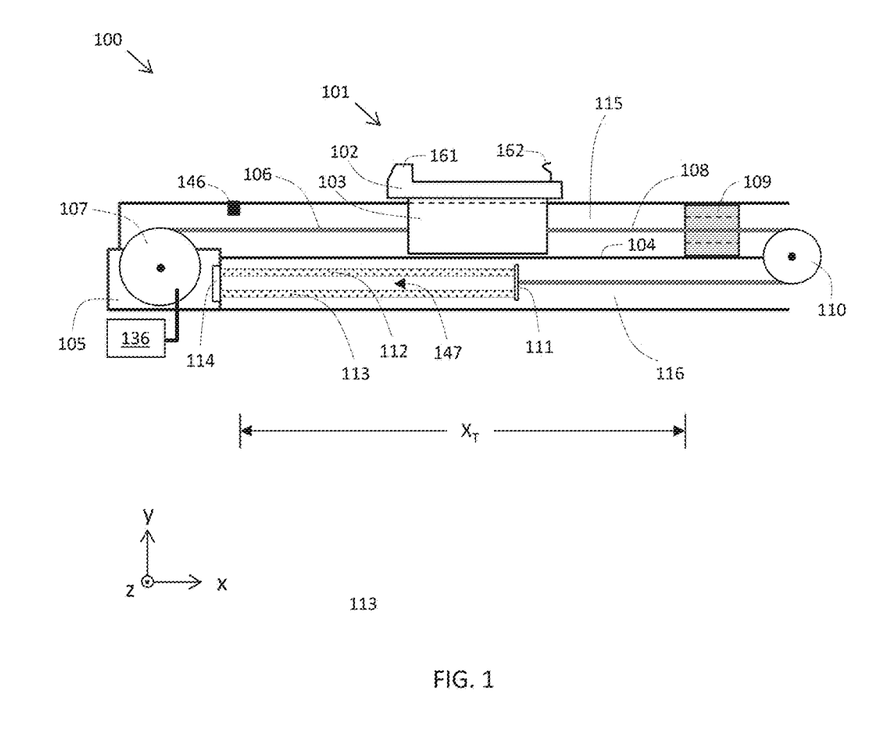
FIG. 1 illustrates an embodiment of the rapid unmanned aerial vehicle launcher.
Figure 2:
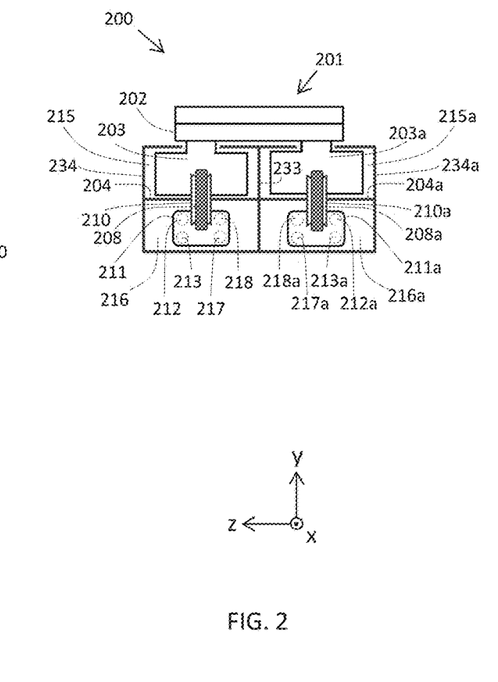
FIG. 2 illustrates a second view of the rapid unmanned aerial vehicle launcher.

Launcher 100 is generally illustrated at FIGS. 1 and 2, where FIGS. 1 and 2 are oriented as indicated by the respective axes shown. At FIG. 1, Launcher 100 comprises a shuttle generally indicated as 101 and comprising an upper shuttle assembly 102 and a lower shuttle assembly 103, with lower shuttle assembly 103 coupled to upper shuttle assembly 102. In a particular embodiment, lower shuttle assembly 103 is fixably attached to upper shuttle assembly 102. Lower shuttle assembly 103 extends into rail channel 115 and is in contact with rail surface 104 such that during operation of launcher 100, upper shuttle assembly 102 and lower shuttle assembly 103 may translate along or over some length of rail surface 104. Rail channel 115 extends substantially over the length of rail surface 104 to allow corresponding translation of upper shuttle assembly 102 when lower shuttle assembly 103 translates. As indicated, rail surface 104 is fixably attached to a foundation 105. In a particular embodiment, lower shuttle assembly 103 comprises a slider assembly in contact with rail surface 104, and the slider assembly slides on rail surface 104 during translation of lower shuttle assembly 103. In another embodiment, a shuttle assembly stop 146 is coupled to UAV launcher 100 to arrest translation of lower shuttle assembly 103 toward the winch, as will be discussed. in some embodiments, upper shuttle assembly 102 comprises a UAV support member 161 to motivate a loaded UAV during a launch sequence and a UAV hook 162 to prevent a loaded UAV from becoming airborne before the launch sequence completes.

As illustrated at FIG. 1, a winch strap 106 is connected from lower shuttle assembly 103, proceeds through a portion of rail channel 115, and extends to a winch 107. Winch 107 is coupled to launcher foundation 105, typically fixably attached. An intermediary rope 108 extends from an opposite side of lower shuttle assembly 103, proceeds through another portion of rail channel 115, extends through a brake 109, and around a pulley 110. Brake 109 is disposed at least partially within rail channel 115 such that brake 109 acts to arrest translation of at least lower shuttle assembly 103. Pulley 110 is coupled to UAV launcher 100 so that, from pulley 110. intermediary rope 108 extends through a bungee enclosure 116 to connect to a forward bungee connector 111. Forward bungee connector is connected to an elastic unit generally indicated at 147 and represented as a first plurality of bungees comprising bungee 112 and bungee 113. Elastic unit 147 comprising bungees 112 and 113 is connected to an aft bungee connector 114 which is attached to launcher foundation 105, Typically each bungee in the first plurality of bungees are individually attached to forward bungee connector 111 and aft bungee connector 114, and each bungee extends from forward bungee connector 111 to aft bungee connector 114 through bungee enclosure 116. Additionally and regarding FIG. 1, each of winch strap 106, lower shuttle assembly 103, rail channel 115, Rail surface 104, intermediary rope 108, brake 109, pulley 110, forward bungee connector 111, the first plurality of bungees, and aft bungee connector 114 have at least one counterpart not visible at FIG. 1, as will be discussed.

Selected components discussed above and illustrated at FIG.1 comprise a rail system, where the rail system comprises rail channel 115, rail surface 104, lower shuttle assembly 103, winch strap 106, brake 109, elastic unit 147, forward bungee connector 111, aft bungee connector 114, intermediary rope 108, and pulley 110. Within the first rail system, lower shuttle assembly 103 contacts rail surface 104 and is coupled to the upper shuttle assembly, winch strap 106 extends through a portion of rail channel 115 and couples to lower shuttle assembly 103 and winch 107, brake 109 is positioned within rail channel 115 to arrest movement of lower shuttle assembly 103 along rail surface 104, intermediary rope 108 extends from lower shuttle assembly 103, over pulley 110, and couples to forward bungee connector 111, and elastic unit 147 extends between forward bungee connector 111 and aft bungee connector 114. In certain embodiments, rail surface 104 is substantially parallel to a longitudinal axis extending through rail channel 115, and a translation distance $X_T$ is parallel to the longitudinal axis and extends generally from shuttle assembly stop 146 to brake 109 of the rail system. The translation distance $X_T$ represents the translation available to lower shuttle assembly 103 while lower shuttle assembly 103 contacts rail surface 115 and moves through rail channel 115.

Typically UAV launcher 100 employs a plurality of rail systems such that UAV launcher 100 comprises at least a first rail system and a second rail system. This is illustrated at FIG. 2, where launcher 100 is shown as launcher 200 and viewed in accordance with the axes shown. As illustrated and regarding the first rail system, rail channel 115 is indicated as first rail channel 215 extending in the direction of the x-axis shown. Upper shuttle assembly 202 is coupled to first lower shuttle assembly 203, which extends into first rail channel 215 and contacts first rail surface 204. Brake 109 of FIG. 1 is omitted at FIG. 2 for clarity. First intermediary rope 208 extends from first lower shuttle assembly 203 and extends through first rail channel 215, around first pulley 210, through first bungee enclosure 216, and connects to first forward bungee connector 211. Bungee 212 and bungee 213 are visible behind first forward bungee connector 211 and coupled to first forward bungee connector 211. Also illustrated are bungees 217 and 218, similarly coupled to first forward bungee connector 211. Bungees 212, 213, 217, and 218 are further coupled at respective opposite ends to an first aft bungee connector (not shown). Additionally, a first winch strap (not shown) extends from first lower shuttle assembly 203 to a winch (not shown).

Regarding the second rail system of FIG. 2, a second rail channel 215a and second rail surface 204a similarly extend in the direction of the x-axis shown. A second lower shuttle assembly 203a is coupled to upper shuttle assembly 202 and extends into second rail channel 215a as illustrated. A second intermediary rope 208a extends from second lower shuttle assembly 203a, extends through second rail channel 215a, around second pulley 210a, through second bungee enclosure 216a, and couples to second forward bungee connector 211a. Bungees 212a, 213a, 217a, and 218a comprise a second plurality of bungees, and are individually connected to second forward bungee connector 211a and a second aft bungee connector (not shown) at respective opposite ends. Additionally, a second winch strap (not shown) extends from second lower shuttle assembly 203a to the winch (not shown). The winch typically comprises a common shaft to which both winch straps are connected, such that rotation of the common shaft generates substantially equal tension in both the first winch strap and second winch strap.

In a typical operation, a UAV is positioned on upper shuttle assembly 201, and winch 107 is employed to place both first and second winch straps in tension, drawing shuttle assembly 101 (201) comprising upper shuttle assembly 102 (202), first lower shuttle assembly 203, and second lower shuttle assembly 203a toward winch 107. As shuttle assembly 101 (201) proceeds toward winch 107, first intermediary rope 208 and second intermediary rope 208a are placed in tension around first pulley 210 and second pulley 210a respectively, and first forward bungee connector 211 and second forward bungee connector 211a are pulled toward first pulley 210 and second pulley 210a. As first forward bungee connector 211 and second forward bungee connector 211a are pulled toward the corresponding pulleys, both the first plurality of bungees (i.e. bungees 212, 213, 217, and 218) and the second plurality of bungees (i.e. bungees 212a, 213a, 217a, and 218a) extend as a group, due to the anchoring of both pluralities at foundation 105. This extension generates an increasing spring force as shuttle assembly 101 proceeds toward winch 107.

When shuttle assembly 101 has been drawn over a translation distance $X_T$ to a particular position on rail surface 104, winch 107 is released. On release, the first plurality of bungees (i.e. bungees 212, 213, 217, and 218) and the second plurality of bungees (i.e. bungees 212a, 213a, 217a, and 218a) return to a relaxed position, acting to pull shuttle assembly 201 toward pulleys 210 and 210a. Correspondingly, lower shuttle assembly 203 and 203a slidably translate and/or roll along rail surfaces 204 and 204a toward pulleys 210 and 210a, until the progress of shuttle assembly 201 is impeded by the brake 109. The winch straps lengths are typically sized such that straps act as primary brakes and brake 109 acts to simultaneously stop shuttle assembly 101. Upon encountering the brake, movement of shuttle assembly 201 substantially ceases and the UAV positioned on shuttle assembly 201 launches from the forward momentum imparted to the UAV during the launch process. As discussed, in some embodiments, launcher 100 further comprises a shuttle assembly stop 146 which arrests movement of at least one lower shuttle assembly such as 103 and/or the upper shuttle assembly 102 when lower shuttle assembly 103 translates toward winch 107 along rail surface 104. Shuttle assembly stop may be any device or mechanical arrangement configured to arrest at least one shuttle assembly and/or the upper shuttle assembly.

In a particular embodiment comprising a first and second rail system, the rail surface of the first rail system is parallel to a first longitudinal axis extending through the first rail channel, and the rail surface of the second rail system is parallel to a second longitudinal axis extending through the second rail channel, and the first longitudinal axis is substantially parallel to the second longitudinal axis. Here, "parallel" or "substantially parallel" mean that a first direction vector is parallel to a first line and a second direction vector is parallel to a second line, and the angle between the first direction vector and the second direction vector is less than 5 degrees, preferably less than 2 degrees, and more preferably less than 1 degree. Similarly, when a surface is substantially parallel to the first line, this means that a $3^{rd}$ direction vector is parallel to the surface and co-planer with the first line, and the angle between the first direction vector and the third direction vector is less than 5 degrees, preferably less than 2 degrees, and more preferably less than 1 degree. in another embodiment, the rail surface of the first rail system and the rail surface of the second rail system are substantially co-planer. Here, "co-planer" or "substantially co-planer" mean that over a translation distance $X_T$ available to a lower shuttle assembly while the lower shuttle assembly contacts a rail surface, the rail surface of the first rail system and the rail surface of the second rail system are in-plane with a given geometric plane to within 0.01 $X_T$, preferably to within 0.005 $X_T$, and more preferably to within 0.002 $X_T$.

The elastic units within each rail system of launcher 100 are generally intended to experience substantially equivalent elongation as the shuttle assembly is pulled toward the winch, and generally intended to possess substantially equivalent spring constants over the elongation, so that the elastic units provide substantially equal force to each rail system he winch releases and the shuttle assembly is pulled toward the respective pulleys for subsequent UAV launch. For example, at FIG. 2, the first plurality of bungees and the second plurality of bungees each relax in a manner which provides substantially equal force on lower shuttle assembly 203 and 203a. The substantially equal force is intended to evenly partition overall force to mitigate loading on individual rail systems, as yell as act to maintain the alignment of lower shuttle assembly 203 and 203a within the respective rail channels as shuttle assembly 201 travels toward pulleys 210 and 210a. In an embodiment, a first force $F_1$ is needed to extend the elastic unit of a first rail system over a distance $X_K$ and a second force $F_2$ is needed to extend the elastic unit of a second rail system over the distance $X_K$, and $0.9 \leq F_1/F_2 \leq 1.1$, preferably $0.95 \leq F_1/F_2 \leq 1.05$, more preferably $0.99 \leq F_1/F_2 \leq 1.01$. Similarly in an embodiment, the elastic unit of the first rail system has a spring constant $K_1$ equal to $F_1/X_K$ and the elastic unit of the second rail system has a spring constant $K_2$ equal to $F_2/X_K$, and $0.9 \leq K_1/K_2 \leq 1.1$, preferably $0.95 \leq K_1/K_2 \leq 1.05$, more preferably $0.99 \leq K_1/K_2 \leq 1.01$.

Additionally, in order to provide the substantially equivalent forces the respective elongation of the first elastic unit and the second elastic unit are typically intended to be generally equivalent during a launching operation. Toward this end and in a particular embodiment, when the lower shuttle assembly of a first rail system is in contact with the brake of the first rail system, a distance between the aft bungee connector of the first rail system and the forward bungee connector of the first rail system is equal to $X_{B1}$, and when the lower shuttle assembly of the second rail system is in contact with the brake of the second rail system, a distance between the aft bungee connector of the second rail system and the forward bungee connector of the second rail system is equal to $X_{B2}$, and $0.90 \leq X_{B1}/X_{B2} \leq 1.10$, preferably $0.95 \leq X_{B1}/X_{B2} \leq 1.05$, and more preferably $0.99 \leq X_{B1}/X_{B2} \leq 1.01$, such that the first and second elastic units have generally equivalent lengths when the respective elastic units are in a minimum tension during a launch operation. Similarly, in an embodiment, when the shuttle assembly is pulled by a winch strap in a direction toward the winch while a lower shuttle assembly contacts the rail surface, the forward bungee connector of a first rail system displaces a distance $X_{B3}$ and the forward bungee connector of a second rail system displaces a distance $X_{B4}$, and $0.90 \leq X_{B3}/X_{B4} \leq 1.10$, preferably $0.95 \leq X_{B3}/X_{B4} \leq 1.05$, and more preferably $0.99 \leq X_{B3}/X_{B4} \leq 1.01$, such that the first and second elastic units experience generally equivalent elongation as the shuttle assembly translates toward a launch position.

Figure 3:
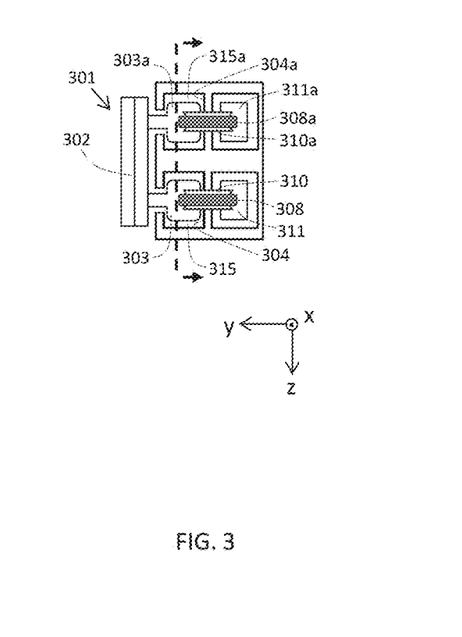
FIG. 3 illustrates another embodiment of the rapid unmanned aerial vehicle launcher.
Figure 4:
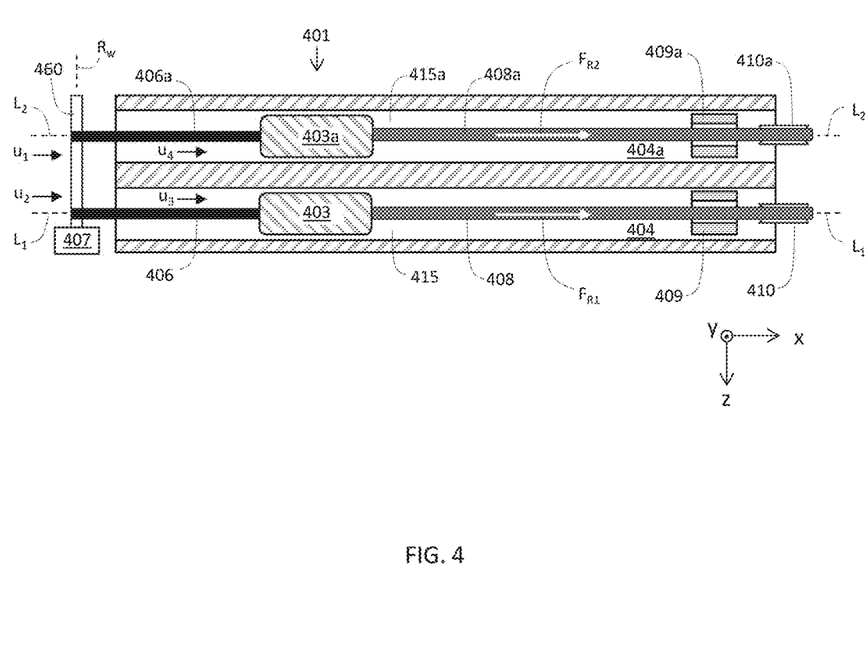
FIG. 4 illustrates a second view of the embodiment of FIG. 3.

In some embodiments where a first rail system has a first longitudinal axis extending through its rail channel, each rail system in the plurality of rails systems has a longitudinal axis extending through its respective first rail channel, and every longitudinal axis in the plurality is substantially parallel to the first longitudinal axis. As an example, FIG. 3 illustrates a view of launcher 100 comprising shuttle assembly 302 and lower shuttle assemblies 303 and 303a within rail channels 315 and 315a and slidably contacting rail surfaces 304 and 304a respectively. Lower shuttle assemblies 303 and 303a are individually coupled to intermediary ropes 308 and 308a, which respectively extend over pulleys 310 and 310a before coupling to forward bungee connectors 311 and 311a. FIG. 4 presents a cross-section view of FIG. 3 rotated 90 degrees and sectioned in accordance with the cutting plane illustrated. Brake 109 of FIG. 1 is not shown at FIG. 3 for clarity but is included at FIG. 4, as brake 409. At FIG. 4, first longitudinal axis $L_1$ extends through rail channel 415 and second longitudinal axis $L_2$ extends through rail channel 415a. In the embodiment illustrated, first longitudinal axis $L_1$ is substantially parallel to rail surface 404 and second longitudinal axis $L_2$ is substantially parallel to rail surface 404a. Additionally, first longitudinal axis $L_1$ is substantially parallel to second longitudinal axis $L_2$. This is indicated by first direction vector $u_1$ parallel to first longitudinal axis $L_1$ and second direction vector $u_2$ parallel to second longitudinal axis $L_2$, and the angle between $u_1$ and $u_2$ less than 5 degrees, preferably less than 2 degrees, and more preferably less than 1 degree, as earlier discussed. Similarly, a third direction vector $u_3$ is parallel to rail surface 404 and co-planer with first longitudinal axis $L_1$ and a fourth direction vector $u_4$ is parallel to rail surface 404a and co-planer with second longitudinal axis $L_2$, and the respective angles between $u_1$ and $u_3$ and $u_2$ and $u_4$ are less than 5 degrees, preferably less than 2 degrees, and more preferably less than 1 degree.

In certain embodiments, brake 409 and 409a are placed within rail channels 404 and 404a respectively in order to arrest the motion of lower shuttle assemblies 403 and 403a while the respective elastic units of the rail systems remain in a tensioned position with elongation of the elastic unit generally greater than 10%, preferably 15%, more preferably 20%. Similarly, when the lower shuttle assemblies are withdrawn from the brake to a position corresponding to the translation distance $X_T$, the respective elastic units of the rail systems remain in a tensioned position with elongations generally less than 90%, preferably less than 85%, more preferably less than 80%. The elongation range of from about 20% to about 80% generally allows the elastic unit to operate in the elongation range where the force versus displacement characteristics of the elastic unit are generally linear. Further, by maintaining the elastic unit at an elongation generally less than 80% at launch, jerk of the shuttle assembly may be mitigated as the lower shuttle assemblies proceed toward the respective pulleys. Further, ceasing relaxation of the elastic units through the action of the brake while the elastic units remain under tension prevents the excessive vibration of and accompanying wear to the elastic units associated with sudden and complete relaxation, in other embodiments, the winch comprises a winch shaft having an axis of rotation perpendicular to the first longitudinal axis and the winch strap of each rail system in the plurality is coupled to the winch shaft. This is additionally illustrated at FIG. 4, where in the first rail system, rope 408 extends over pulley 410 and couples to lower shuttle assembly 403 within rail channel 415, and winch strap 406 couples to lower shuttle assembly 403 within rail channel 415 before attaching to winch shaft 460. Similarly in the second rail system, rope 408a extends over pulley 410a and couples to lower shuttle assembly 403a within rail channel 415a, and winch strap 406a couples to lower shuttle assembly 403a within rail channel 415a before additionally attaching to winch shaft 460. Winch shaft 460 comprises winch 407. At FIG. 4, an axis of rotation $R_w$ of winch shaft 460 is perpendicular to first longitudinal axis $L_1$, and winch straps 406 and 406a are each coupled to winch shaft 460. With second longitudinal axis $L_2$ substantially parallel to first longitudinal axis $L_1$ as occurs at FIG. 4, this arrangement allows each rotation of the single winch shaft 460 to reel substantially equal portions of winch straps 406 and 406a. In a particular embodiment where a first winch strap and a second winch strap are connected to a winch shaft, a single rotation of the winch shaft reels a length of the first winch strap equal to $X_{L1}$ and reels a length of the second winch strap equal to $X_{L2}$, and $0.90 \leq X_{L1}/X_{L2} \leq 1.10$, preferably $0.95 \leq X_{L1}/X_{L2} \leq 1.05$, and more preferably $0.99 \leq X_{L1}/X_{L2} \leq 1.01$. Reeling substantially equivalent lengths with a common shaft assists in providing for the elastic members of the first and second rail systems to be extended in a substantially equivalent manner during the process, so that the resulting tension forces acting on each lower shuttle assembly through the intermediary rope and shown as $F_{R1}$ and $F_{R2}$ are generally equivalent. These balanced forces assist in maintaining the alignment of substantially conforming lower shuttle assembly 403 within rail channel 415 and lower shuttle assembly 403a within rail channel 415a when the winch is released and shuttle assembly 401 rapidly accelerates toward pulleys 410 and 410a under the tension forces $F_{R1}$ and $F_{R2}$. This balancing is additionally assisted in embodiments earlier discussed, where a first force $F_1$ extends the elastic unit of a first rail system and a second force $F_2$ extend the elastic unit of a second rail system both over a distance $X_K$, and $0.9 \leq F_1/F_2 \leq 1.1$, preferably $0.95 \leq F_1/F_2 \leq 1.05$, more preferably $0.99 \leq F_1/F_2 \leq 1.01$. Additionally in some embodiments, the length of the winch straps is established to that the winch straps become taut as the lower shuttle assemblies approach the brake, so that tension in the winch straps assists the brake in arresting the lower shuttle assemblies.

As indicated, in some embodiments, the elastic unit of a given rail system comprises a plurality of bungees, with each bungee in the plurality coupled to the forward bungee connector of the given rail system at a first end and coupled to the aft bungee connector of the given rail system at a second end. Each plurality of bungees comprises at least two, preferably at least four, more preferably at least six separate bungees and typically each bungee in a given plurality of bungees exhibits substantially equivalent elasticity. In an embodiment, each bungee in a plurality of bungees has a spring constant $k_i$ over a distance $X_K$, and the spring constant $k_i$ for each bungee is within 10% of a mean $k_m$, where $k_m$ is a mean among all $k_i$ in the plurality, such that for any $k_i$, $0.9 \leq k_i/k_m \leq 1.1$, preferably $0.95 \leq k_i/k_m \leq 1.05$, and more preferably $0.99 \leq k_i/k_m \leq 1.01$. Among other advantages, these arrangements in a given plurality of bungees may act to mitigate the impact of fatigue experienced by a given bungee in a plurality as a result of many cycles of launcher operation. Additionally, the use of an intermediary rope coupled to a forward bungee connector and extending over a pulley as discussed allows the intermediary rope to pull the lower shuttle assembly, rather than employing the elastic units directly. This allows the use multiple bungees in a plurality to be utilized as the elastic unit without requiring a corresponding increase in the width and size of the pulley to accommodate additional bungees, and thereby mitigates or eliminates the increased mass, friction, and additional inertia such a necessary increase in the pulley would introduce into the system.

Figure 5:
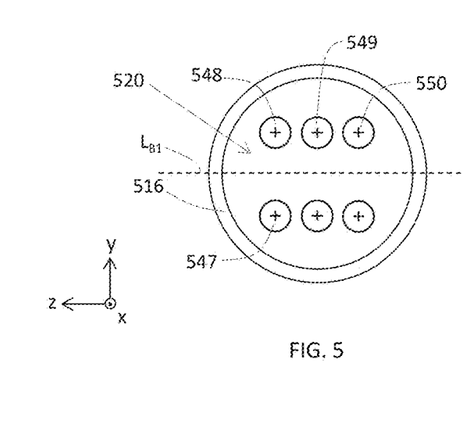
FIG. 5 illustrates a specific embodiment of a plurality of bungees.

In a particular embodiment, a plurality of bungees is attached to a forward bungee connector such as 111 and an aft bungee connector such as 114 in a manner such that the collection of connections of individual bungees display reflection symmetry around some axis. For example, FIG. 5 illustrates a first plurality of bungees generally indicated by 520 and comprising bungee 547, 548, 549, and 550, among others illustrated. The first plurality comprises the six separate bungees surrounded by a bungee enclosure 516 and viewed along the x-axes of FIGS. 1-4 as indicated. At FIG. 5, individual bungees are illustrated as circles with connection points to a forward or aft bungee connector generally indicated at the approximate center of each circle. As illustrated, the first plurality 520 is arranged such that the collection of connections points exhibit a reflection symmetry around axis $L_{B1}$. Such an arrangement may tend to mitigate variabilities in the individual spring constants $k_i$ which may be present in a given plurality of bungees, and assists in symmetrically distributing generally equal tension forces in order to produce an overall resultant force on the forward or aft bungee connector which is substantially parallel to a longitudinal axis perpendicular to axis $L_{B1}$, for example, a longitudinal axis of bungee enclosure 516. In a particular embodiment, a first plurality of bungees is attached to a forward bungee connector with reflection symmetry around an axis $L_{B1}$ and the first plurality is attached to an aft bungee connector with reflection symmetry around an axis $L_{B2}$ and $L_{B1}$ and $L_{B1}$ are substantially parallel. In another embodiment, an extension axis is perpendicular to both axis $L_{B1}$ and axis $L_{B2}$ and the extension axis intersects the forward bungee connector 111 and the aft bungee connector 114 of FIG. 1. In a further embodiment, each bungee in the first plurality is substantially parallel to the extension axis when the forward bungee connector of the first rail system displaces the distance $X_{B3}$, and in a still further embodiment, a section of the intermediary rope coupled to the forward bungee connector is substantially parallel to the extension axis, such that the first plurality bungees and the section of the intermediary rope are generally aligned.

Figure 6:
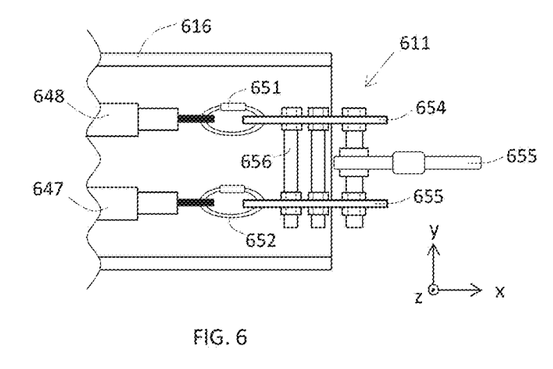
FIG. 6 illustrates a specific embodiment of a bungee connector for a plurality of bungees.
Figure 7:
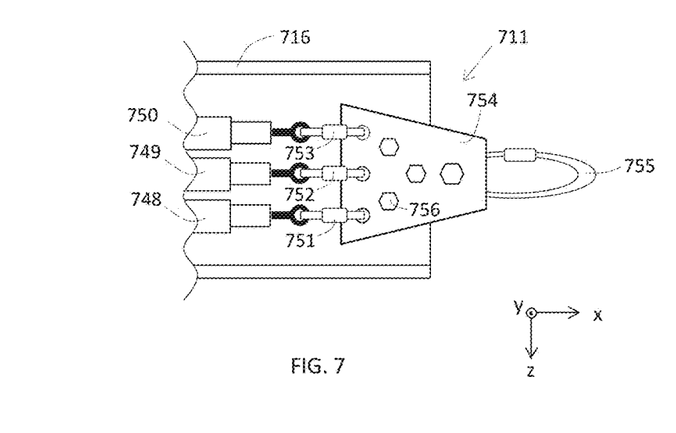
FIG. 7 illustrates a second view of the bungee connector of FIG. 6.
Figure 8:
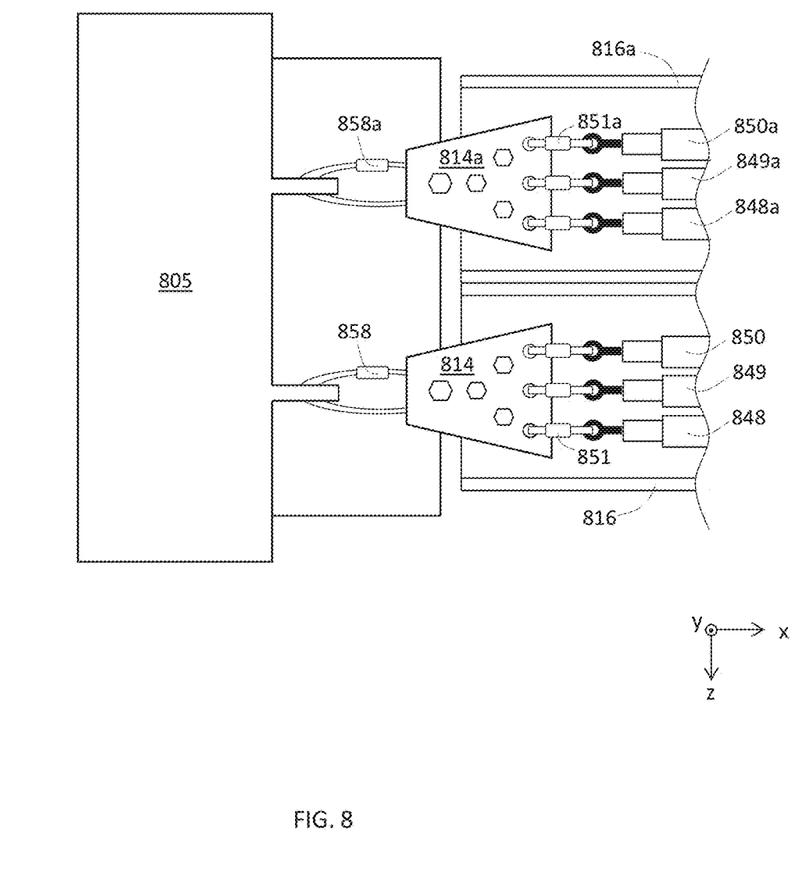
FIG. 8 illustrates an embodiment of an aft bungee connector.

An embodiment of a particular forward bungee connector is illustrated at FIGS. 6 and 7 as forward bungee connector 611 and 711 respectively, illustrated as components within a section of launcher 101. FIG. 6 illustrates bungees 548 and 547 as 648 and 647 and surrounded by bungee enclosure 616, and indicates the respective bungees coupled to forward bungee connector 611 through quick link devices 651 and 652. FIG. 7 illustrates the forward bungee connector in a view rotated 90 degrees, and indicates bungees 548, 549, and 550 as 748, 749, and 750 within bungee enclosure 716, with the respective bungees coupled to forward bungee connector 711 through quick link devices 751, 752, and 753. In the embodiment illustrated at FIGS. 6 and 7, the forward bungee connector utilizes two plates 654 and 655 rigidly connected by bolting members such as 656 in order to establish bungee connections which exhibit the reflection symmetry of FIG. 5. This is also reflected at FIG. 7, illustrating plate 754 and bolting member 756. Forward bungee connector couples to an intermediary rope at FIG. 6 via quick link 655, shown as 755 at FIG. 7. In a particular embodiment, an aft bungee connector is configured similarly and an analogous quick link to 655 couples to foundation 105 of FIG. 1. As an example, FIG. 8 illustrates aft bungee connectors in a first and second rail system, with bungees 750, 749, and 748 of FIG. 7 represented as 850, 849, and 848 within bungee enclosure 816. Bungees 850, 849, and 848 are individually coupled to aft bungee connector 814 through quick links such as quick link 851, and aft bungee connector 814 is coupled to launcher foundation 805 via quick link 858. A corresponding aft bungee connector for a second plurality of bungees comprising a second rail system in the plurality of rail systems is additionally shown, with bungees 850a, 849a, and 848a within bungee enclosure 816a and individually coupled to aft bungee connector 814a through quick links such as quick link 851a, and aft bungee connector 814a coupled to launcher foundation 805 via quick link 858a.

In a particular embodiment, winch 107 is a powered winch, such as a battery powered winch. In one embodiment, the battery powered winch is a customized recreational boat commercial off-the-shelf (COTS) winch. In one embodiment, a 12-volt battery is connected to winch 107 to supply power to winch 107; a fully charged battery is calculated to provide over 500 launches on a single charge, in another embodiment, launcher 100 further includes a control system 136. In one embodiment control system 136 is used to control the retraction and release of the winch straps. In one embodiment, control system 136 includes a control switch having three positions corresponding to: (1) neutral, (2) pull shuttle back by rotating the winch in the reel-in direction of rotation, and (3) release winch from locked position to release shuttle by rotating the winch in the reel-out direction of rotation.

In one embodiment, launcher 100 further includes miscellaneous hardware, such as fittings, pulleys and other components as shown in the drawings.

Figure 9:
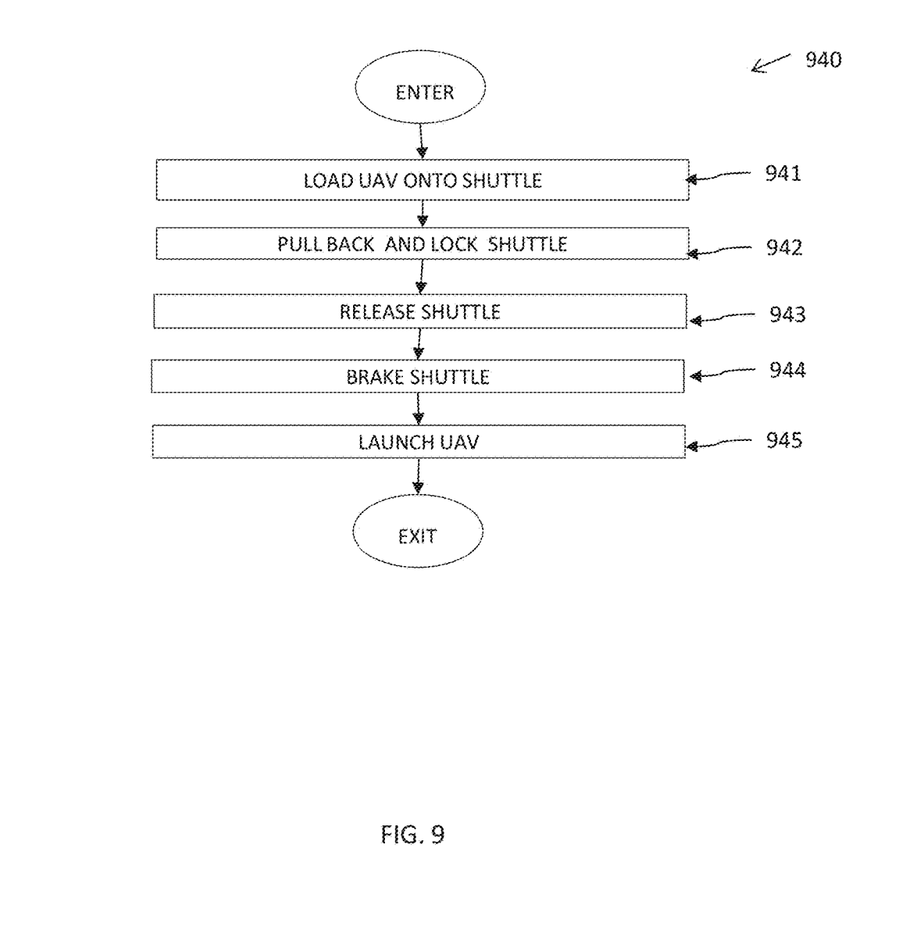
FIG. 9 illustrates a process flow diagram of a method for launching a UAV in accordance with one embodiment of the invention.

FIG. 9 illustrates a process flow diagram of a method 940 for launching a UAV using launcher 100 in accordance with one embodiment of the invention. In operation 941 an operator loads a UAV, such as a thirty (30) pound UAV, on the shuttle at the forward end of the rails while the pluralities of bungees are not under tension. For example, when the control switch of the control system is set to position 1, the operator places the UAV on the top plate of the shuttle and for example engages the UAV hook with a UAV hook engagement on the upper shuttle assembly. In operation 942, the operator then engages the winch to pull the shuttle back to the cocked position in approximately 10 seconds. For example, when the control switch of the control system is set to position 2 for the winch reel-in rotation. As the winch straps are retracted toward the back of launcher 100, the shuttle is pulled back along the rails and the bungee cords attached to the shuttle are extended toward the pulleys. When the shuttle reaches a preferred stop point along the rails, the winch is stopped and locked in position by the winch. In operation 943 the operator releases the winch by pushing a command button on the control system for the winch reel-out rotation to launch the UAV. For example, when the control switch of the control system is set to position 3, the winch drum is released from the locked position allowing the winch straps to uncoil from the winch mechanism. When the winch is released from the locked position, the shuttle travels forward and carries the UAV by pushing the rear of the UAV and holding the UAV on the shuttle using the forward hook of the UAV to prevent the UAVs tendency to want to rise off the shuttle prior to the shuttle hitting the brake system at the end of the rails. In operation 943, the shuttle is stopped by the winch straps and hits the brake system at the end of the rails, simultaneously. In operation 944 the UAV is ejected off the shuttle and into the air. In one embodiment, the UAV is ejected from the rails at approximately 35 miles per hour (mph).

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A UAV launcher comprising:
    an upper shuttle assembly;
    a winch coupled to a launcher foundation; and
    a plurality of rail systems where each rail system comprises:
        a rail channel comprising a rail surface, where the rail surface of a first rail system of the plurality of rail systems is substantially parallel to a first longitudinal axis and where the rail surface of a second rail system of the plurality of rail systems is substantially parallel to a second longitudinal axis, and where the first longitudinal axis is substantially parallel to the second longitudinal axis;
        a lower shuttle assembly contacting the rail surface and the lower shuttle assembly coupled to the upper shuttle assembly;
        a winch strap extending through some portion of the rail channel, where a first end of the winch strap is coupled to the lower shuttle assembly and a second end of the winch strap is coupled to the winch;
        a brake disposed within the rail channel and positioned within the rail channel such that the lower shuttle assembly is between the brake and the winch strap, where the brake is disposed within the rail channel to arrest movement of the lower shuttle assembly over the rail surface;
        an elastic unit where the elastic unit is coupled to a forward bungee connector and an aft bungee connector, where the aft bungee connector is coupled to the launcher foundation, and where the elastic unit of the first rail system of the plurality of rail systems has a spring constant $K_1$ over a distance $X_K$ and the elastic unit of the second rail system of the plurality of rail systems has a spring constant $K_2$ over the distance $X_K$, and where $0.95 \leq K_1/K_2 \leq 1.05$;
        an intermediary rope comprising a first rope portion disposed within the rail channel, where a first end of the intermediary rope is coupled to the lower shuttle assembly and a second end of the intermediary rope is coupled to the forward bungee connector, and where the lower shuttle assembly is between the first rope portion and the winch strap; and
        a pulley in contact with the intermediary rope between the first end of the intermediary rope and the second end of the intermediary rope and positioned to establish the first rope portion disposed within the rail channel.

2. The UAV launcher of claim 1 where the elastic unit is a plurality of bungees where each bungee in the plurality of bungees is coupled to the forward bungee connector at a first end of the each bungee and coupled to the aft bungee connector at a second end of the each bungee, and where the each bungee in the plurality of bungees has a spring constant $k_{i-1}$ over a distance $X_K$, and where $k_{m-1}$ is a mean of all $k_{i-1}$ in the first plurality of bungees, and where for any $k_{i-1}$, $0.95 \leq k_{i-1}/k_{m-1} \leq 1.05$.

3. The UAV launcher of claim 1 where when the lower shuttle assembly of the first rail system is in contact with the brake of the first rail system, a distance between the aft bungee connector of the first rail system and the forward bungee connector of the first rail system is equal to $X_{B1}$, and where when the lower shuttle assembly of the second rail system is in contact with the brake of the second rail system, a distance between the aft bungee connector of the second rail system and the forward bungee connector of the second rail system is equal to $X_{B2}$, and where $0.95 \leq X_{B2} \leq 1.05$.

4. The UAV launcher of claim 3 where the elastic unit of the first rail system is a first plurality of bungees where each bungee in the first plurality of bungees is coupled to the forward bungee connector of the first rail system at a first end of the each bungee and coupled to the aft bungee connector of the first rail system at a second end of the each bungee, and where the elastic unit of the second rail system is a second plurality of bungees where every bungee in the second plurality of bungees is coupled to the forward bungee connector of the second rail system at one end of the every bungee and coupled to the aft bungee connector of the second rail system at another end of the every bungee.

5. The UAV launcher of claim 4 where the each bungee in the first plurality of bungees has a spring constant $k_{i-1}$ over the distance $X_K$, and where $k_{m-1}$ is a mean of all $k_{i-1}$ in the first plurality of bungees, and where for any $k_{i-1}$, $0.95 \leq k_{i-1}/k_{m-1} \leq 1.05$.

6. The UAV launcher of claim 5 where the every bungee in the second plurality of bungees has a spring constant $k_{i-2}$ over the distance $X_K$, and where $k_{m-2}$ is a mean of all $k_{i-2}$ in the second plurality of bungees, and where for any $k_{i-2}$, $0.95 \leq k_{i-2}/k_{m-2} \leq 1.05$, and where $0.95 \leq k_{m-1}/k_{-2} \leq 1.05$.

7. The UAV launcher of claim 3 where when the winch strap of the first rail system pulls the lower shuttle assembly of the first rail system in a direction toward the winch while the lower shuttle assembly of the first rail system is in contact with the rail surface of the first rail system, the forward bungee connector of a first rail system displaces a distance $X_{B3}$ and the forward bungee connector of a second rail system displaces a distance $X_{B4}$, and $0.95 \leq X_{B3}/X_{B4} \leq 1.05$.

8. The UAV launcher of claim where the winch comprises a winch shaft, and where the second end of the winch strap of the first rail system is coupled to the winch shaft and the second end of the winch strap of the second rail system is coupled to the winch shaft, and where the winch shaft has an axis of rotation perpendicular to the first longitudinal axis.

9. The UAV launcher of claim 8 where a single rotation of the winch shaft reels a length $X_{L1}$ of the winch strap of the first rail system and the single rotation of the winch shaft reels a length $X_{L2}$ of the winch strap of the second rail system, and $0.95 \leq X_{L1}/X_{L2} \leq 1.05$.

10. The UAV launcher of claim 8 further comprising a shuttle assembly stop which arrests movement of the lower shuttle assembly of the first rail system toward the winch when the lower shuttle assembly of the first rail system contacts the rail surface of the first rail system, and where a translation distance $X_T$ extends from the shuttle assembly stop to the brake of the first rail system, and where when the lower shuttle assembly of the first rail system translates over the translation distance $X_T$ while contacting the rail surface of the first rail system, the rail channel of the first rail system constrains the lower shuttle assembly of the first rail system from translating in a direction perpendicular to $X_T$ by an amount exceeding $0.001\ X_T$.

11. The UAV launcher of claim 1 where the upper shuttle assembly comprises a UAV support member and a UAV hook.

12. A method of launching a UAV using the UAV launcher of claim 11 comprising:
loading a UAV on the upper shuttle assembly by placing the UAV in contact with the UAV support member of the upper shuttle assembly and in contact with the UAV hook of the upper shuttle assembly;
retracting the winch strap of each rail system in the plurality of rail systems using the winch and translating the lower shuttle assembly of the each rail system along the rail surface of the each rail system toward the winch,
utilizing the displacement of the lower shuttle assembly of the each rail system to tension the intermediary rope of the each rail system coupled to the lower shuttle assembly of the each rail system and the forward bungee connector of the each rail system and extending over the pulley of the each rail system;
utilizing the tension of the intermediary rope of the each rail system to displace the forward bungee connector of the each rail system toward the pulley of the each rail system;
utilizing the displacement of the forward bungee connector of the each rail system to extend the elastic member of the each rail system coupled to the forward bungee connector of the each rail system and the aft bungee connector of the each rail system;
continuing the retracting until the lower shuttle assembly of the each rail system reaches a particular position on the rail surface of the each rail system, thereby achieving a launch position for the UAV;
releasing the winch and allowing the elastic member of the each rail system to pull the lower shuttle assembly of the each rail system toward the pulley of the each rail system, thereby displacing the upper shuttle assembly coupled to the lower shuttle assembly of the each rail system toward the pulley of the each rail system and thereby displacing the UAV support member comprising the upper shuttle assembly toward the pulley of the each rail system;
utilizing the displacement of the UAV support member to motivate the UAV in contact with the UAV support member toward the pulley of the each rail system; and
ejecting the UAV off the upper shuttle assembly by arresting the displacement of the lower shuttle assembly toward the pulley of the each rail system using the brake of the each rail system, thereby arresting the displacement of the upper shuttle assembly and arresting the displacement of the UAV support member motivating the UAV, thereby launching the UAV.

13. A UAV launcher comprising:
an upper shuttle assembly where the upper shuttle assembly comprises a UAV support member and a UAV hook;
a winch coupled to a launcher foundation;
a plurality of rail systems, where each rail system comprises:
a rail channel comprising a rail surface where the rail surface is substantially parallel to a longitudinal axis extending through the rail channel, and where the longitudinal axis is substantially parallel to every other longitudinal axis in the plurality of rail systems;
a lower shuttle assembly contacting the rail surface and the lower shuttle assembly coupled to the upper shuttle assembly;
a winch strap extending through some portion of the rail channel, where a first end of the winch strap is coupled to the lower shuttle assembly and a second end of the winch strap is coupled to the winch;
a brake disposed within the rail channel and positioned within the rail channel such that the lower shuttle assembly is between the brake and the winch strap, where the brake is disposed within the rail channel to arrest movement of the lower shuttle assembly over the rail surface;
an elastic unit where the elastic unit is coupled to a forward bungee connector and an aft bungee connector, where the aft bungee connector is coupled to the launcher foundation, and where the elastic unit has a spring constant $K_1$ over a distance $X_K$ and an elastic unit of any other rail system in the plurality of rail systems has a spring constant $K_2$ over the distance $X_K$, and where $0.95 \le K_1/K_2 \le 1.05$, and where when the lower shuttle assembly is in contact with the brake, a distance between the aft bungee connector and the forward bungee connector is equal to $X_{B1}$, and where when a lower shuttle assembly of the any other rail system is in contact with a brake of the any other rail system, a distance between an aft bungee connector of the any other rail system and the forward bungee connector of the any other rail system is equal to $X_{B2}$, and where $0.95 \le X_{B1}/X_{B2} \le 1.05$;

an intermediary rope comprising a first rope portion disposed within the rail channel, where a first end of the intermediary rope is coupled to the lower shuttle assembly and a second end of the intermediary rope is coupled to the forward bungee connector, and where the lower shuttle assembly is between the first rope portion and the winch strap; and a pulley coupled to the UAV launcher and in contact with the intermediary rope between the first end of the intermediary rope and the second end of the intermediary rope and positioned to establish the first rope portion disposed within the rail channel.

14. The UAV launcher of claim 13 where the elastic unit is a plurality of bungees where each bungee in the plurality of bungees is coupled to the forward bungee connector at a first end of the each bungee and coupled to the aft bungee connector at a second end of the each bungee, and where the each bungee in the plurality of bungees has a spring constant $k_{i-1}$ over the distance $X_K$, and where $k_{m-1}$ is a mean of all $k_{i-1}$ in the plurality of bungees, and where for any $k_{i-1}$ in the plurality of bungees, $0.95 \le k_{i-1}/k_{m-1} \le 1.05$.

15. The UAV launcher of claim 14 where when the winch strap pulls the lower shuttle assembly in a direction toward the winch while the lower shuttle assembly is in contact with the rail surface, the forward bungee connector displaces a distance $X_{B3}$, and where when a winch strap of the any other rail system pulls the lower shuttle assembly of the any other system in the direction toward the winch while the lower shuttle assembly of the any other system is in contact with a rail surface of the any other system, the forward bungee connector of the any other system displaces a distance $X_{B4}$, and $0.95 \le X_{B3}/X_{B4} \le 1.05$.

16. The UAV launcher of claim 15 where the winch comprises a winch shaft, where the second end of the winch strap is coupled to the winch shaft and where a single rotation of the winch shaft reels a length $X_{L1}$ of the winch strap, and where a second end of the winch strap of the any other rail system is coupled to the winch shaft, and where the single rotation of the winch shaft reels a length $X_{L2}$ of the winch strap of the any other rail system, and $0.95 \le X_{L1}/X_{L2} \le 1.05$.

* * * * *